March 15, 1960 J. S. CHRISTIE 2,928,310
DEVICE FOR DETERMINING COLOR
Filed March 9, 1955 3 Sheets-Sheet 1
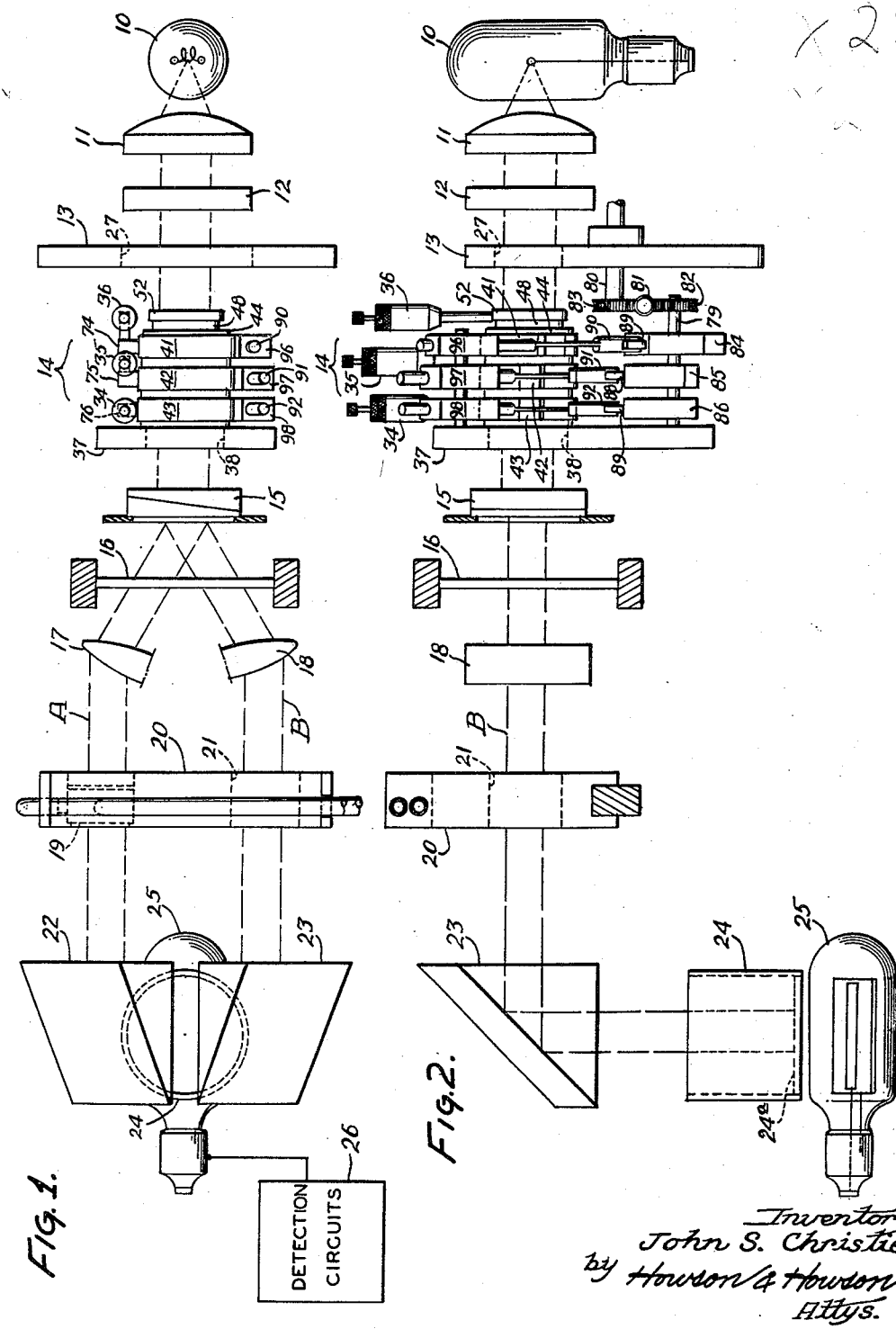

March 15, 1960

J. S. CHRISTIE 2,928,310

DEVICE FOR DETERMINING COLOR

Filed March 9, 1955

Inventor:
John S. Christie
by Howson & Howson
Attys.

March 15, 1960 J. S. CHRISTIE 2,928,310
DEVICE FOR DETERMINING COLOR
Filed March 9, 1955 3 Sheets-Sheet 3

Inventor:
John S. Christie
by Howson & Howson
Attys.

United States Patent Office 2,928,310
Patented Mar. 15, 1960

2,928,310

DEVICE FOR DETERMINING COLOR

John S. Christie, Oreland, Pa., assignor to Proctor & Schwartz, Inc., Philadelphia, Pa., a corporation of Pennsylvania Application March 9, 1955, Serial No. 493,127

4 Claims. (Cl. 88—14)

This invention relates to color testing systems and more particularly to systems of the type in which color testing is effected by comparison of light transmissions being representative respectively of a standard color and the color of a sample under test.

An example of such a testing system as employed in the past is the so-called tri-stimulus color comparator system manufactured by General Electric Company. Such a system determines quantitatively primary color components present in a test sample of a light-transmissive medium or substance whose color it is desired to determine in comparison to a standard. This is accomplished by providing two light beams and by comparing the light transmission in one beam through the test sample with the light transmission in the other beam through a color standard, for each of the primary colors employed. A useful application of such a comparator system is the color testing of a dye solution by comparison of light transmission through a sample of the dye solution with light transmission through a standard at one or more points in the visible spectrum, for example at three points corresponding respectively to red dye, yellow dye, and blue dye, all of which have minimum transmission points at different places in the spectrum. A rotating filter wheel is employed, which has a monochromatic filter for each dye to transmit only the wave-lengths for controlling that dye (or color). In practice, the dye solution to be tested may be circulated through a test cell.

In the above-mentioned system, the standard employed is a cell containing a solution of dye of the desired color. This has not been completely satisfactory for a number of reasons. In the first place, the accuracy of the color testing depends upon the accuracy with which the standard solution is prepared. In the second place, there are problems of stability of such standard dye solutions with time due to the deteriorating action of light, oxidation and the elevated temperatures used in the circulated dye solution. The standard must be maintained at the same temperature as the circulated dye solution in order not to introduce errors due to changes of light transmission with temperature, and unless the standard is replaced often, it will deteriorate with use due to the effects of light and oxidation.

The principal object of the present invention is to overcome the objections and disadvantages incident to the use of a standard solution in a system of the character above mentioned.

In accordance with this invention, the use of a color standard may be completely eliminated, and the light transmission in one of the light beams is preestablished as a standard, for each of the primary colors employed. More particularly, the light transmission in the original light beam is effectively made to simulate the light transmission through a color standard, for each of the primary colors employed. This is accomplished by light polarization, as hereinafter described. The light transmission in the other beam through the test sample is compared with the light transmission in the first beam, for each of the primary colors employed, as in the above-mentioned system.

The invention may be clearly understood from the following detailed description with reference to the accompanying drawings, in which Fig. 1 is a generally diagrammatic plan view of a color testing system of the type above mentioned with the present invention incorporated therein;

Fig. 2 is a similar elevational view of the system;

Figure 3:
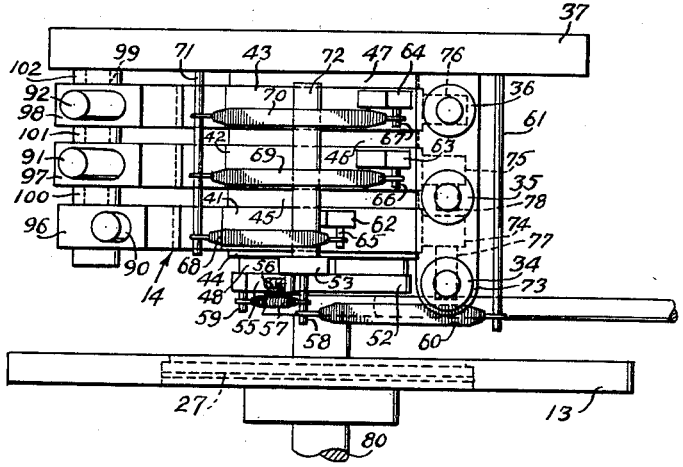
Fig. 3 is a plan view of the preferred mechanism provided by this invention to effect standardization of transmission in one of the light beams as above mentioned.

In Figs. 1 and 2, the old elements of the General Electric system are shown diagrammatically, and for the present purpose, it will be necessary to describe the system as a whole only to the extent requisite for a clear understanding of this invention.

In this system, light from a source 10 is converged into a parallel beam by condensing lens 11, and passes through a heat-absorbing element 12. The light beam then passes through a color filter wheel or disk 13 which is driven at constant speed and which, in the case of a tri-color system, has three monochromatic filters arranged to be brought successively and sequentially into the path of the light beam. In the system presently employed, the color filter wheel is driven at a speed of 5 r.p.m., but it may be driven at any suitable speed. Disregarding for the present the mechanism 14 provided by the present invention, the light beam passes through a Wollaston prism 15 which splits the beam into two divergent light beams A and B, and which also plane polarizes the beams so that beam A is polarized in a plane inclined at 45° to the right of vertical and beam B is polarized in a plane inclined at 45° to the left of vertical. Element 16 is a rotating polarity-responsive filter whose plane of polarization rotates. When its plane of polarization is parallel to the plane of polarization of either beam A or beam B, it passes a maximum amount of the light of that beam; and when its plane of polarization is at right angles to the plane of polarization of either beam A or beam B, it does not pass any of the light from that beam. At other angles, the light passed is proportional to the sine of the angle. Due to the rotation of the polarity-responsive filter 16, the intensity of the light in each beam reaches a maximum and a minimum twice during each revolution, and since the two light beams are plane polarized 90° apart, there is a 90° time or phase relation between the beams. Thus the two beams may be represented as sine waves with a 90° time or phase displacement between them.

Element 16 may be a Nicol prism, but in the system now being employed it is composed of two glass plates with a plastic or gelatin based polarizing filter element sandwiched between them. In the system now being employed, element 16 is mounted in a large diameter ball bearing and is driven through a toothed belt by a synchronous motor to insure synchronous speed. However, it could be mounted directly in a hollow shaft synchronous motor.

The divergent beams are converted to parallel beams by segmented cylindrical lenses 17 and 18. Beam A then passes through a cell 19, a sample holder through which the dye solution being monitored is circulated.

The dye solution comes from a bath (not shown) to which the sample cell is coupled by hose connection 19a. A pump, or other appropriate means (not shown) may be employed to produce continuous flow from the bath to the sample holder. Connection 19b permits the fluid to flow out either back to the bath or elewhere. Cell 19 is mounted in a block 20 which has an aperture 21 through which the beam B may freely pass. In prior systems employing a color standard, the second beam B was passed through a standard cell containing dye solution of the desired color. As previously stated, this has been objectionable for a number of reasons, and the principal purpose of the present invention is to overcome the objections and disadvantages incident thereto. In accordance with the present invention, the light transmission in beam B is standardized, by means of mechanism 14 presently to be described, so as to simulate transmission through a color standard, without incurring the disadvantages of a color standard.

As shown in Figs. 1 and 2, the two light beams A and B are redirected convergently downward by tilted prisms 22 and 23 through tube 24 onto a ground glass disk 24a at the bottom of said tube. If the light transmissions in the two beams A and B are equal, the illumination on the disk is substantially constant, because the light intensity of one beam decreases as that of the other beam increases, and vice versa. However, unequal transmission in the two beams A and B causes light pulses which produce an output from phototube 25, which in turn activates detection circuits 26. The latter may simply give an indication of the unbalanced condition and/or may control a valve to add dye stuff to the solution under test so as to increase its concentration.

In the system presently employed, element 16 is conveniently driven at a speed of 1800 r.p.m., a speed easily available from the 60 cycle per second frequency of the supply line from which the electrical circuits are operated. Thus the pulsating output of the phototube 25, when such output occurs, is synchronized with the supply current. This is useful in operation of the detection circuits. For example, the output of phototube 25 could be applied to a cathode ray tube whose sweep is controlled from the supply line. However the present invention is not concerned with the electrical system.

In accordance with this invention, the standardization in beam B is effected by pre-polarizing the light by means of an element in the mechanism 14, so as to decrease the light transmission in beam B to equal the light transmission through a color standard. In the case of a tricolor system this is done for each of the three primary colors employed, so that the light transmission in beam B is standardized for each color. This pre-polarization of the light is accomplished by means of a rotatably adjustable light polarizing element. Suppose, for example, that this element were adjusted so as to polarize the light in a plane at 45° to the right of vertical. Full transmission would then be obtained in beam A, and there would be no transmission in beam B. On the other hand, if this polarizing element were adjusted to polarize the light in a plane at 45° to the left of vertical, full transmission would be obtained in beam B, and there would be no transmission in beam A. By adjustment of the element between these extreme positions, transmission is obtained in both of the beams, and by properly adjusting the element for each color, the transmission in beam B can be decreased to equal the transmission through a color standard.

Figure 4:
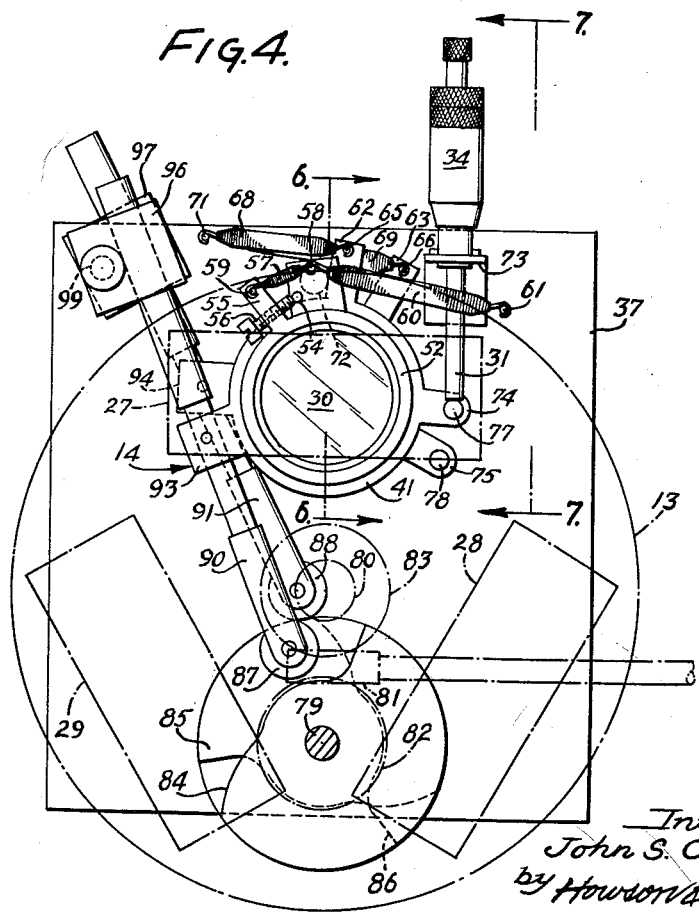
Fig. 4 is a face view of this mechanism.

Referring now particularly to Figs. 3 to 7 which show the mechanism 14 of Figs. 1 and 2, as may be seen in Fig. 4, the color filter wheel or disk 13 has three color filter sections 27, 28 and 29 which are brought sequentially into the path of the light beam from source 10. A light polarizing element 30 is disposed in the path of the light beam, and as mentioned above, this element is rotatably positioned, for each of the colors employed, so as to effect standardized transmission of light in beam B. The three different positions of the light polarizing element 30 are established by three adjustable stops 31, 32 and 33 (see Fig. 7) which, when adjusted, remain stationary. These stops are in the form of longitudinally adjustable stems of micrometer adjustment devices 34, 35 and 36.

The entire mechanism for effecting rotative adjustment of the light polarizing element 30 is supported by a stationary supporting plate 37. As may be seen in Fig. 6, this plate has an aperture 38 for free passage of the light beam from source 10, and mounted in the aperture and extending forwardly from the supporting plate 37 is a tubular supporting member 39. Mounted on the member 39 is a fixed bearing sleeve 40 which serves to rotatably support rings 41, 42 and 43 that are held in place by flange 44 at the forward end of sleeve 40 and are maintained in spaced relation by rings 45, 46 and 47. Also rotatably supported by the sleeve 40 is a front ring 48 having a tubular extension 49 which extends into a recess 50 of sleeve 40 and is rotatable about a bearing sleeve 51 also disposed in said recess. The light polarizing element 30 is fixedly mounted in a supporting ring 52 which is rotatably supported by ring 48. As may be seen in Fig. 4, ring 48 has an extension 53 which carries a pin 54. Ring 52 has an extension 55 which carries an adjustment screw 56 engageable with pin 54, the purpose of which will be explained later. A spring 57 has its ends secured to pins 58 and 59 on the said extensions, and this spring serves always to maintain ring 52 in fixed relation to ring 48. Thus, the light polarizing element 30 is always maintained in fixed relation to ring 48 and rotates therewith whenever ring 48 moves. A spring 60 has one end secured to pin 58 and has its other end secured to a fixed pin 61 extending from the supporting plate 37. This spring urges ring 48 clockwise, as viewed in Fig. 4.

Rings 41, 42 and 43 (Fig. 3) have extensions 62, 63 and 64 respectively which carry pins 65, 66 and 67. Springs 68, 69 and 70 are secured between the respective pins 65 to 67 and a fixed pin 71 extending from the stationary supporting plate 37. These springs urge the rings 41 to 43 counter-clockwise, as viewed in Fig. 4. A stop pin 72 (see Fig. 3) is carried by and extends from the extension 53 of ring 48, and this pin is engageable by the extensions 62 to 64 of rings 41 to 43. As hereinafter described, only one of the rings 41 to 43 is permitted to be effective at one time and its position is determined by the associated one of the stops 31 to 33. With the position of the effective ring established, spring 60 causes the stop pin 72 to engage the associated stop extension of the effective ring so as to establish the desired position of the light polarizing element 30.

Figure 7:
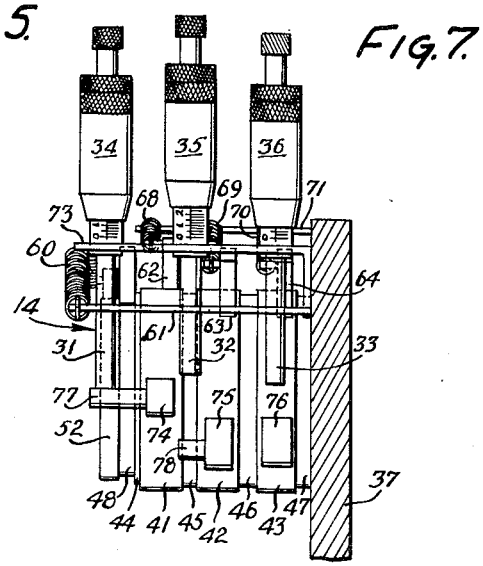
Fig. 7 is a sectional view taken along line 7—7 of Fig. 4.
Figure 6:
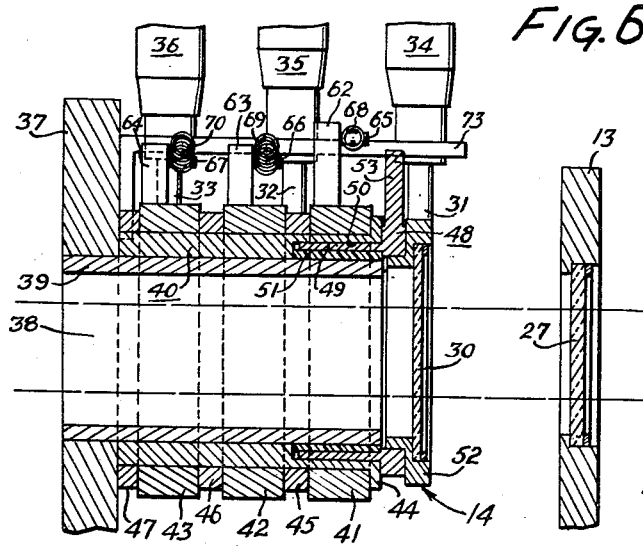
Fig. 6 is a sectional view taken along line 6—6 of Fig. 4.

As may be seen in Fig. 7, the micrometer adjustment devices 34 to 36 are mounted on a bracket 73 secured to the supporting plate, and the rings 41 to 43 are provided with extensions 74 to 76 through which the positions of the rings are established by the stops 31 to 33. Extensions 74 and 75 have lateral fingers 77 and 78 for engagement with the stops 31 and 32, while extension 76 is engageable directly with stop 33. The only reason for the fingers 77 and 78 is to permit close spacing of the rings 41 to 43. The extensions 74—76 with their associated fingers 77 and 78 constitute movable stops.

Figure 5:
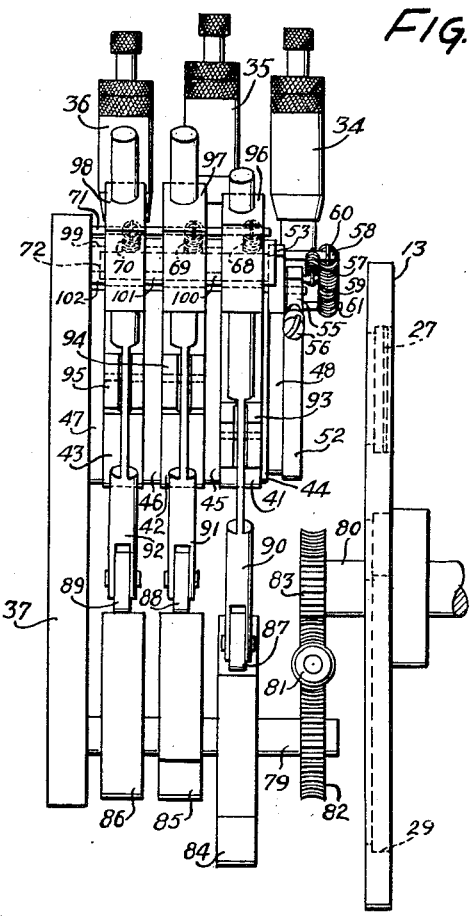
Fig. 5 is a side elevational view of the same.

As may be seen in Figs. 4 and 5, a shaft 79 is rotatably supported by the supporting plate 37. This shaft is driven synchronously with the shaft 80 of the color filter wheel 13 through a motor driven worm 81 which meshes with worm gears 82 and 83 mounted respectively on the two shafts. Three similar cams 84, 85 and 86 are mounted on shaft 79 and are disposed in 120° angular relation to one another. These cams are engageable with rollers 87, 88 and 89 carried at the ends of rods 90, 91 and 92. The latter have flat central sections which are pin connected to bifurcated extensions 93, 94 and 95 on rings 41 to 43.

The upper portions of the rods 90 to 92 are slidably supported by bearing elements 96 to 98 which are rotatably mounted on a fixed stud 99 and are held in spaced relation by spacer rings or collars 100 to 102.

The cams 84 to 86 are shaped so that at any particular time one of the rollers 87 to 89 is out of engagement with its associated cam while the other two rollers are engaged by their associated cams. The two engaged rollers are held by their cams in raised position to render two of the rings 41 to 43 ineffective. Thus, in the condition shown in the drawings, rings 42 and 43 have been moved clockwise, as viewed in Fig. 4, and their extensions 75 and 76 are out of engagement with the associated stops 32 and 33, as may be seen in Fig. 7. Roller 87 is out of engagement with its associated cam 84, and therefore ring 41 is effective, and its spring 68 is permitted to move this ring counter-clockwise so that its extension 77 is in engagement with the stop 31. The position of the light polarizing element 30, at this time, is therefore established by the stop 31 through the medium of ring 41, rod 72 and ring 48.

From the foregoing description, it will be seen that rings 41 to 43 are rendered effective successively by the cams 84 to 86, and the effective ring is urged by its spring to a position determined by the associated one of the fixed stops 31 to 33. At the same time, ring 48 is moved by spring 60 to a position determined by the engagement of stop pin 72 with the extension on the effective one of the rings 41 to 43. The light polarizing element 30 follows the movement of ring 48 by reason of the action of spring 57. Thus the adjustable light polarizing element 30 is moved successively to three positions determined by the fixed stops 31 to 33.

In operation, as the cam shaft 79 is driven synchronously with the shaft 80 of color filter wheel 13, each time one of the color filter sections 27 to 29 moves into the path of the light beam from source 10, the light polarizing element 30 is positioned for the particular color by one of the stops 31 to 33 corresponding to that color. These stops are preset to establish different positions of the light polarizing element 30 for the three colors, and each position of the light polarizing element establishes a predetermined light transmission in beam B corresponding to transmission of the colored light through a color standard.

The light transmission in beam A through the test cell 19 is compared with the transmission in beam B for each of the colors employed. The light comparison function remains unchanged, and is performed in the manner previously described.

The purpose of the adjusting screw 56 may now be understood. In presetting the stops 31 to 33, prior to use of the apparatus, each stop is adjusted, with the proper color filter section in effective position, until zero output from phototube 25 is obtained. This may be done without the sample cell 19 in place, but it is preferably done with the sample cell in place and filled with clear water, since this automatically compensates for the absorptance and reflectance of the cell and water. This procedure effectively standardizes the transmission in beam B for each of the colors. The adjusting screw 56 better enables critical adjustment to zero output. Thus when the first one of the stops 31 to 33 is adjusted, screw 56 may be manipulated to establish the precise position of light polarizing element 30 to give zero output. Element 30 is then in the optimum position relative to ring 48 for adjustment of the other stops.

From the foregoing description, it will be seen that the present invention provides a novel method and a novel operative combination for establishing a standard for each of the colors employed, and eliminates the necessity of employing a color standard with its incident objections and disadvantages.

While a preferred embodiment of the invention has been illustrated and described, the invention is not limited thereto but contemplates such modifications and other embodiments as may occur to those skilled in the art.

I claim:

1. In a color testing system, a light source containing light of all colors involved in a sample to be tested, means for dividing the light from said source into two differently-plane polarized light beams, polarizing means in each beam effective to cause the beam to vary sinusoidally in light intensity 90° out of phase with one another, means for disposing the sample to be tested in the path of one of said beams, power-driven rotatable color filter means for sequentially converting the light from said source to different colors, rotationally adjustable plane polarizing means adapted to be effective upon the intensity of the beam other than the one in which the sample is located, means for defining different predetermined positions of said polarizing means, and means operable synchronously with said color filter means for sequentially establishing said positions of said polarizing means, thereby to establish predetermined light transmission in the other of said beams for each of said colors.

2. In a color testing system, a light source containing light of all colors involved in a sample to be tested, means for dividing the light from said source into two differently-plane polarized light beams, polarizing means in each beam effective to cause the beams to vary sinusoidally in light intensity 90° out of phase with one another, means for disposing the sample to be tested in the path of one of said beams, power-driven rotatable color filter means for sequentially converting the light from said source to different colors, rotationally adjustable plane polarizing means adapted to be effective upon the intensity of the beam other than the one in which the sample is located, a plurality of adjustable stops for defining different predetermined positions of said polarizing means, and means operable synchronously with said color filter means for sequentially establishing said positions of said polarizing means, thereby to establish predetermined light transmission in the other of said beams for each of said colors.

3. In a color testing system, a light source containing light of all colors involved in a sample to be tested, means for dividing the light from said source into two differently-plane polarized light beams, means for disposing the sample to be tested in the path of one of said beams, power-driven rotatable color filter means for sequentially converting the light from said source to different colors, a rotationally adjustable plane polarizing element for effecting different polarizations of the light from said source, a plurality of adjustable stops corresponding in number to the number of said colors for defining different predetermined positions of said polarizing element to establish predetermined light transmissions in the other of said beams, a plurality of movable stops engageable respectively with said first stops, biasing springs urging said movable stops toward said first stops, means operable synchronously with said filter means for controlling said movable stops so as to effect sequential engagement of said movable stops with said first stops, and means for adjusting said polarizing element according to the position of each movable stop when it is engaged with one of said first stops.

4. In a color testing system, a light source containing light of all colors involved in a sample to be tested, means for dividing the light from said source into two differently-plane polarized light beams, means for disposing the sample to be tested in the path of one of said beams, power-driven rotatable color filter means for sequentially converting the light from said source to different colors, a rotationally adjustable plane polarizing element for effecting different polarizations of the light from said source, a plurality of adjustable stops corresponding in number to the number of said colors for defining different predetermined positions of said polarizing element to establish predetermined light transmissions in the other of said beams, a plurality of movable stops engageable respectively with said first stops, biasing springs urging said movable stops toward said first stops, means including a plurality of cams operable synchronously with said filter means for effecting sequential engagement of said movable stops with said first stops, and means for adjusting said polarizing element according to the position of each movable stop when it is engaged with one of said first stops.

References Cited in the file of this patent
UNITED STATES PATENTS

| | | |
|---|---|---|
| 1,894,132 | Stone | Jan. 10, 1933 |
| 2,157,389 | Park | May 9, 1939 |
| 2,351,932 | Deckel et al. | June 20, 1944 |
| 2,601,182 | Tyler | June 17, 1952 |
| 2,682,801 | Davidson et al. | July 6, 1954 |
| 2,753,754 | Le Clair | July 10, 1956 |
| 2,774,276 | Glasser et al. | Dec. 18, 1956 |